United States Patent
French et al.

(10) Patent No.: US 12,050,330 B2
(45) Date of Patent: Jul. 30, 2024

(54) COLOR FILTER ARRAY FOR REFLECTIVE DISPLAY DEVICE

(71) Applicant: E Ink Holdings Inc., Hsinchu (TW)

(72) Inventors: Ian French, Hsinchu (TW); Xian-Teng Chung, Hsinchu (TW); Po-Yuan Lo, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 97 days.

(21) Appl. No.: 17/349,941

(22) Filed: Jun. 17, 2021

(65) Prior Publication Data

US 2022/0035084 A1    Feb. 3, 2022

Related U.S. Application Data

(60) Provisional application No. 63/058,473, filed on Jul. 29, 2020.

(51) Int. Cl.
*G02B 5/20* (2006.01)

(52) U.S. Cl.
CPC .................................. *G02B 5/201* (2013.01)

(58) Field of Classification Search
CPC . G02B 5/20; G02B 5/22; G02B 5/223; G02B 5/201; G02F 1/133509; G02F 1/133514; G02F 1/1677
USPC .................................................. 359/891, 885
See application file for complete search history.

(56) References Cited

U.S. PATENT DOCUMENTS

| | | | | |
|---|---|---|---|---|
| 6,124,909 | A * | 9/2000 | Miyashita | G02F 1/133514 349/113 |
| 2009/0208853 | A1* | 8/2009 | Sakamoto | G02F 1/133516 430/7 |
| 2012/0008075 | A1 | 1/2012 | Kwon et al. | |
| 2012/0008120 | A1* | 1/2012 | Matsui | G03F 1/50 355/53 |
| 2012/0147314 | A1* | 6/2012 | Yoshizawa | G02B 5/201 315/192 |
| 2012/0287382 | A1* | 11/2012 | Qi | G02B 5/201 359/891 |
| 2015/0109492 | A1* | 4/2015 | Hayashi | H04N 9/04515 348/277 |

FOREIGN PATENT DOCUMENTS

| | | |
|---|---|---|
| JP | H07261166 A | 10/1995 |
| TW | 200946982 A | 11/2009 |
| TW | 201024887 A | 7/2010 |

OTHER PUBLICATIONS

Corresponding Taiwan office action issued on Mar. 9, 2022.
Corresponding Taiwan office action issued on Aug. 22, 2022.

* cited by examiner

*Primary Examiner* — Stephone B Allen
*Assistant Examiner* — Jyotsna V Dabbi
(74) *Attorney, Agent, or Firm* — CKC & Partners Co., LLC

(57) ABSTRACT

A color filter array for a reflective display device includes a plurality of first filter arrays, a plurality of second filter arrays, and a plurality of third filter arrays. Each of the first filter arrays has a plurality of first filter patterns separated from each other. Each of the second filter arrays has a plurality of second filter patterns separated from each other. Each of the third filter arrays has a plurality of third filter patterns separated from each other. Each of the first filter arrays is adjacent to one of the second filter arrays and one of the third filter arrays.

5 Claims, 7 Drawing Sheets

COLOR FILTER ARRAY FOR REFLECTIVE DISPLAY DEVICE

CROSS-REFERENCE TO RELATED APPLICATION

This application claims priority to US Provisional Application Ser. No. 63/058,473, filed Jul. 29, 2020, which is herein incorporated by reference.

BACKGROUND

Field of Invention

The present invention relates to a color filter array for a reflective display device.

Description of Related Art

In the current market of various consumer electronic products, reflective electrophoretic display devices have been widely used as display screens. A display medium layer of the reflective electrophoretic display device is mainly composed of an electrophoretic liquid and white particles and black particles mixed in the electrophoretic liquid. By applying a voltage to the display medium layer, the white particles and the black particles can be driven to move, so that each pixel can display black, white or grayscale. Since incident light is used in the reflective electrophoretic display device to irradiate the display medium layer to form reflected light to achieve the purpose of display, it does not need backlight, so it can save power consumption. The incident light may be sunlight or indoor ambient light.

As for a reflective color electrophoretic display device, a color filter array (CFA) is attached to the display medium layer. However, the graininess of the image displayed by the current reflective color electrophoretic display device is obvious. Therefore, how to reduce the graininess of the image has become an urgent issue in this field.

SUMMARY

In order to solve the above-mentioned issue, the present invention provides a color filter array for a reflective display device, which includes: a plurality of filter arrays in which each of them having a plurality of filter patterns separated from each other, or a plurality of filter units arranged in a staggered arrangement, to effectively reduce the graininess of the image displayed by the display device including the color filter array.

The present invention provides a color filter array for a reflective display device, which includes a plurality of first filter arrays, a plurality of second filter arrays, and a plurality of third filter arrays. Each of the first filter arrays has a plurality of first filter patterns separated from each other. Each of the second filter arrays has a plurality of second filter patterns separated from each other. Each of the third filter arrays has a plurality of third filter patterns separated from each other. Each of the first filter arrays is adjacent to one of the second filter arrays and one of the third filter arrays.

According to some embodiments of the present invention, each of the first filter arrays, each of the second filter arrays, and each of the third filter arrays are rectangular when viewed from above.

According to some embodiments of the present invention, each of the first filter arrays is adjacent to and substantially aligned with the one of the second filter arrays and the one of the third filter arrays along its length direction, and each of the first filter arrays is adjacent to and substantially aligned with another of the second filter arrays and another of the third filter arrays along its width direction.

According to some embodiments of the present invention, each of the first filter arrays is arranged in a staggered arrangement with the one of the second filter arrays and the one of the third filter arrays along its width direction or its length direction.

According to some embodiments of the present invention, each of the first filter arrays has a ratio of a length to a width between 1.8:1 and 5:1.

According to some embodiments of the present invention, a ratio of a width of each of the first filter arrays to a width of each of the first filter patterns is between 2:1 and 5:1.

According to some embodiments of the present invention, a ratio of a width of each of the first filter patterns to a spacing between two adjacent of the first filter patterns is between 1:1 and 3:1.

The present invention also provides a color filter array for a reflective display device, which includes a plurality of first filter units, a plurality of second filter units, and a plurality of third filter units. Each of the first filter units is adjacent to one of the second filter units and one of the third filter units along a first direction, and one of the first filter units is adjacent to and arranged in a staggered arrangement with another of the second filter units and another of the third filter units along a second direction, and the first direction and the second direction are perpendicular to each other.

According to some embodiments of the present invention, each of the first filter units, each of the second filter units, and each of the third filter units are rectangular when viewed from above.

According to some embodiments of the present invention, the first direction is a length direction of each of the first filter units, and the second direction is a width direction of each of the first filter units.

According to some embodiments of the present invention, a projection of the first filter unit in a second direction partially overlaps with the other of the second filter units.

According to some embodiments of the present invention, a ratio of a width of each of the first filter units to a length of each of the first filter units is greater than or equal to ⅓.

According to some embodiments of the present invention, an edge of the first filter unit is aligned with an edge of the other of the third filter units along the second direction.

BRIEF DESCRIPTION OF THE DRAWINGS

In order to make the above and other objects, features, advantages and embodiments of the present invention more obvious and easy to understand, please read the following detailed description with the corresponding drawings.

DETAILED DESCRIPTION

Figure 1:
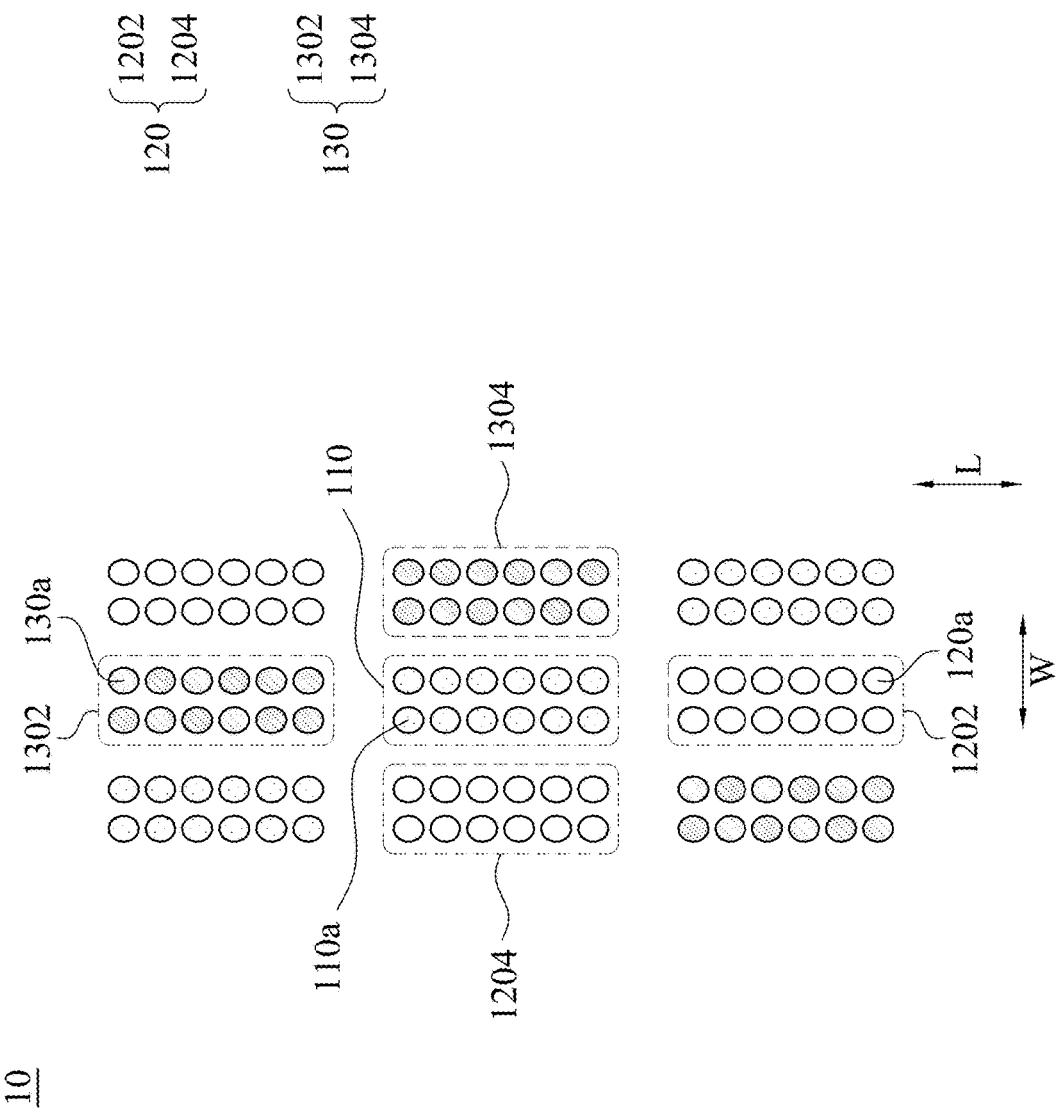
FIG. 1 is a schematic top view of a color filter array according to an embodiment of the present invention.

The following disclosure provides many different embodiments or examples, for implementing different technical features of the provided subject matter. Specific examples of components and arrangements are described below to simplify the present invention. These are, of course, merely examples and are not intended to be limiting. For example, the specification discloses that the first feature structure is formed over the second feature structure, which includes an embodiment in which the first feature structure and the second feature structure are formed in direct contact, and also includes an embodiment in which there are other feature structures between the first feature structure and the second feature structure, that is, the first feature structure and the second feature structure are not in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "over" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations), and the spatially relative descriptions used herein may likewise be interpreted accordingly.

In order to solve the above-mentioned issue, the present invention provides a color filter array for a reflective display device, which includes: a plurality of filter arrays in which each of them having a plurality of filter patterns separated from each other, or a plurality of filter units arranged in a staggered arrangement, to effectively reduce the graininess of the image displayed by the display device including the color filter array. In some embodiments, the reflective display device includes the color filter array of the present invention (referring to FIGS. 1, 5, 6, 7 and 10), an array substrate (not shown) and a display medium layer (not shown) arranged between the color filter array and the array substrate. The display medium layer can reflect incident light so that the user can see the image displayed by the display device. In some embodiments, the display medium layer includes microcapsules or microcups. Various embodiments of the color filter array of the present invention will be described in detail below.

FIG. 1 is a schematic top view of a color filter array 10 according to an embodiment of the present invention. As shown in FIG. 1, the color filter array 10 includes a plurality of first filter arrays 110, a plurality of second filter arrays 120 and a plurality of third filter arrays 130. The first filter arrays 110, the second filter arrays 120, and the third filter arrays 130 are filter arrays having different colors. In some embodiments, the first filter arrays 110 are red filter arrays, and the second filter arrays 120 are green filter arrays, and the third filter arrays 130 are blue filter arrays, but it is not limited thereto.

Each of the first filter arrays 110 has a plurality of first filter patterns 110a separated from each other. Each of the second filter arrays 120 has a plurality of second filter patterns 120a separated from each other. Each of the third filter arrays 130 has a plurality of third filter patterns 130a separated from each other. In this way, the color reflectivity and the brightness of the display device can be significantly improved, thereby effectively reducing the graininess of the image.

Figure 2:
FIG. 2 is an image of a display device having a color filter array composed of a plurality of solid filter patterns.

FIG. 2 is an image of a display device having a color filter array composed of a plurality of solid filter patterns. Specifically, the color filter array used in FIG. 2 is composed of general solid filter patterns (not shown), and the general solid filter patterns have the same size and colors as the first filter arrays 110, the second filter arrays 120, and the third filter arrays of FIG. 1 of the present invention. However, the white state reflectivity of the display device using the color filter array composed of the solid filter patterns is 18%. As shown in FIG. 2, the graininess of the image is quite obvious.

Figure 3:
FIG. 3 is an image of a display device having the color filter array of FIG. 1.

FIG. 3 is an image of a display device having the color filter array of FIG. 1. The white reflectivity of the display device using the first filter arrays 110, the second filter arrays 120, and the third filter arrays 130 of FIG. 1 is 26%. As shown in FIG. 3, the image is less grainy. It can be seen that the use of the first, second, and third filter arrays 110, 120, and 130 of the present invention helps to improve the graininess of the image of the display device.

Please continue to refer to FIG. 1, each of the first filter arrays 110 is adjacent to one second filter array 1202 of the second filter arrays 120 and one third filter array 1302 of the third filter arrays 130. In some embodiments, each of the first filter arrays 110, each of the second filter arrays 120, and each of the third filter arrays 130 are rectangular when viewed from above. In some embodiments, as shown in FIG. 1, each of the first filter arrays 110 is adjacent to and substantially aligned with the second filter array 1202 of the second filter arrays 120 and the third filter array 1302 of the third filter arrays 130 along its length direction L. Each of the first filter arrays 110 is adjacent to and substantially aligned with another second filter array 1204 of the second filter arrays 120 and another third filter array 1304 of the third filter arrays 130 along its width direction W. In this specification, the term "substantially aligned" means that projections of two adjacent elements in a certain direction (e.g., the length direction L or the width direction W) are completely overlapped or nearly completely overlapped.

Figure 4:
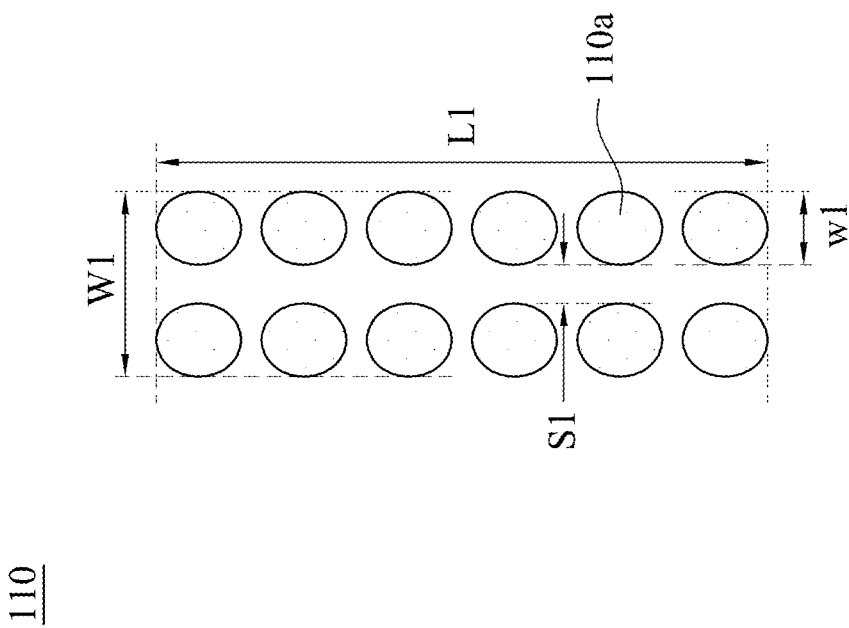
FIG. 4 is an enlarged schematic diagram of the first filter array of FIG. 1.

FIG. 4 is an enlarged schematic diagram of the first filter array 110 of FIG. 1. The following description about the dimensional relationship of the first filter array 110 can also be applied to the second filter array 120 and the third filter array 130 shown in FIG. 1. In some embodiments, as shown in FIG. 4, a ratio of a length L1 to a width W1 of the first filter array 110 is between 1.8:1 and 5:1. In some embodiments, a length L1 is between 200 μm and 260 μm, and a width W1 is between 50 μm and 110 μm.

In some embodiments, as shown in FIG. 4, a ratio of the width W1 of each of the first filter arrays 110 to a width w1 of each of the first filter patterns 110a is between 2:1 and 5:1. In some embodiments, the width w1 is between 15 μm and 40 μm, such as 20 μm, 25 μm, 30 μm, or 35 μm.

In some embodiments, as shown in FIG. 4, a ratio of the width w1 of each of the first filter patterns 110a to a spacing S1 between two adjacent of the first filter patterns 110a is between 1:1 and 3:1. In some embodiments, the spacing S1 is between 5 μm and 30 μm.

In some embodiments, the first filter pattern 110a has an oval shape, but in other embodiments, the first filter pattern may also have other shapes, such as a circle or a polygon, such as a square or a rectangle.

Figure 5:
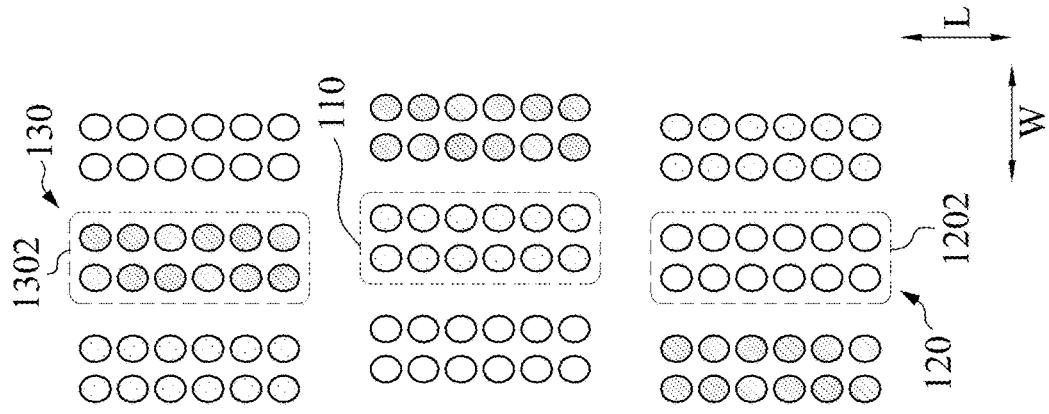
FIG. 5 is a schematic top view of a color filter array according to an embodiment of the present invention.

FIG. 5 is a schematic top view of a color filter array 10 according to an embodiment of the present invention. The difference between the embodiment in FIG. 5 and the embodiment in FIG. 1 is that each of the first filter arrays 110 is arranged in a staggered arrangement with one second filter array 1202 of the second filter arrays 120 and one third filter array 1302 of the third filter arrays 130 along its width direction W.

Figure 6:
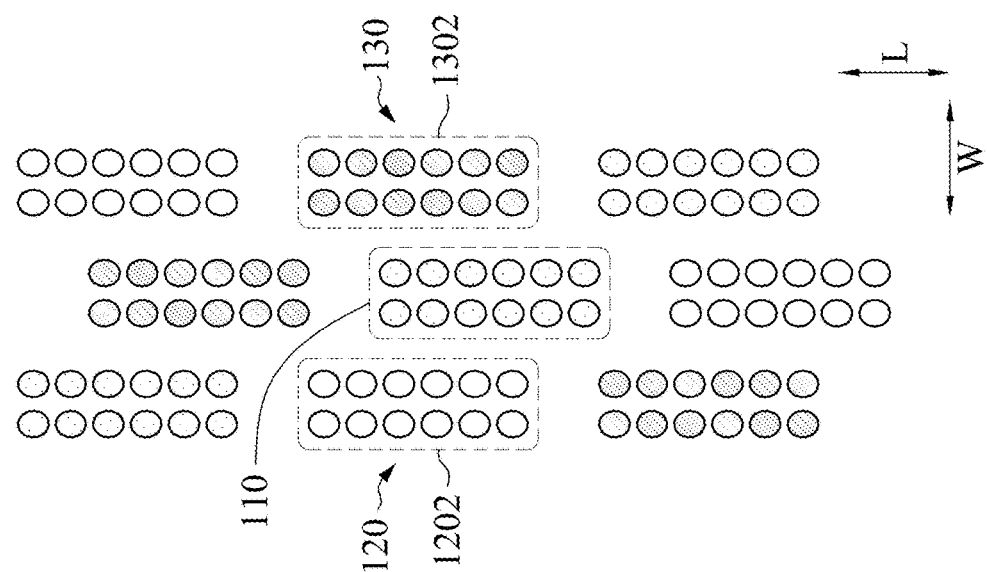
FIG. 6 is a schematic top view of a color filter array according to an embodiment of the present invention.

FIG. 6 is a schematic top view of a color filter array 10 according to an embodiment of the present invention. The difference between the embodiment in FIG. 6 and the embodiment in FIG. 1 is that each of the first filter arrays 110 is arranged in a staggered arrangement with one second filter array 1202 of the second filter arrays 120 and one third filter array 1302 of the third filter arrays 130 along its length direction L.

In this specification, the term "staggered arrangement" means that projections of two adjacent elements in a certain direction (e.g., the width direction W or the length direction L) are partially overlapped, or edges of the two elements are aligned with each other in a certain direction.

Figure 7:
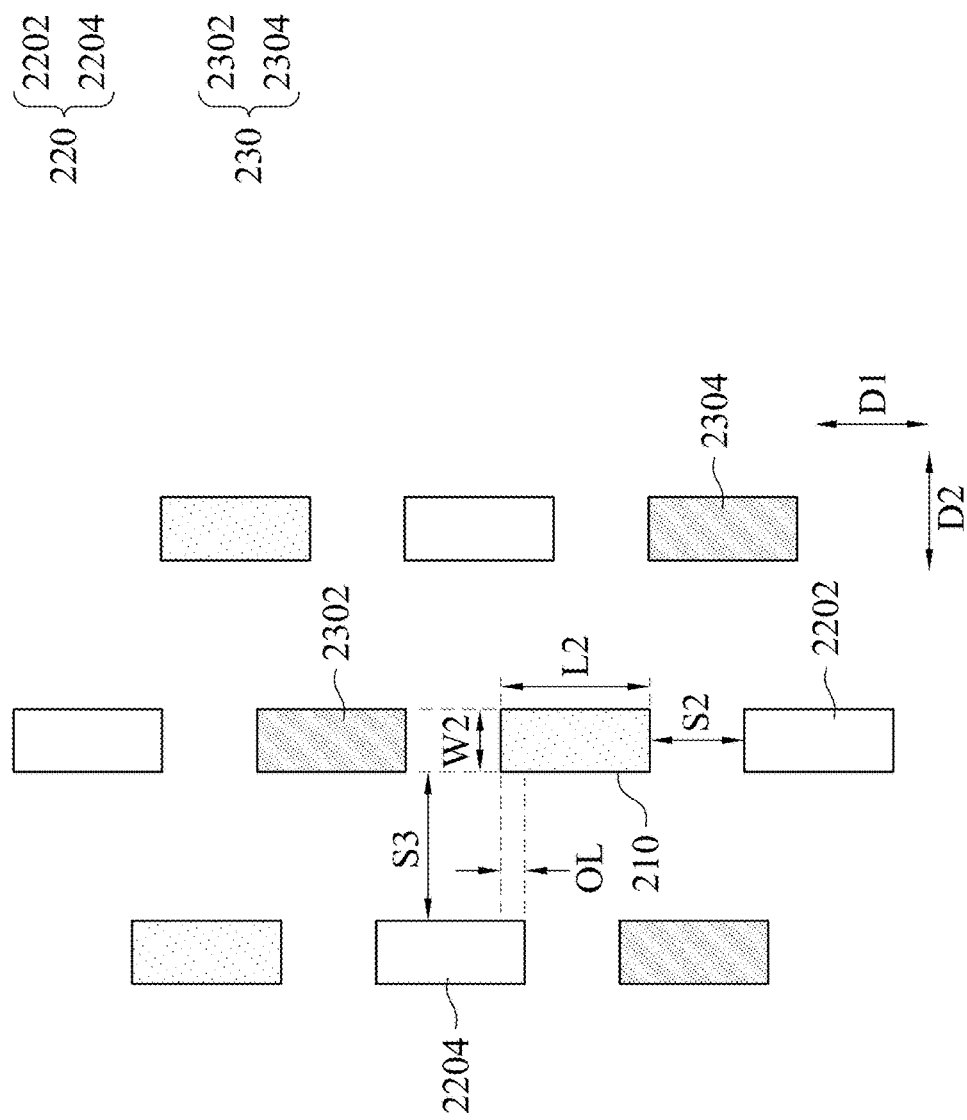
FIG. 7 is a schematic top view of a color filter array according to an embodiment of the present invention.

FIG. 7 is a schematic top view of a color filter array 20 according to an embodiment of the present invention. As shown in FIG. 7, the color filter array 20 includes a plurality of first filter units 210, a plurality of second filter units 220 and a plurality of third filter units 230.

Specifically, each of the first filter units 210 is adjacent to one second filter unit 2202 of the second filter units 220 and one third filter unit 2302 of the third filter units 230 along a first direction D1, and one of the first filter units 210 is adjacent to and arranged in a staggered arrangement with another second filter unit 2204 of the second filter units 220 and another third filter unit 2304 of the third filter units 230 along a second direction D2 (the second direction D2 and the first direction D1 are perpendicular to each other). In this specification, the term "staggered arrangement" means that projections of two adjacent elements in a certain direction are partially overlapped, or edges of the two elements are aligned with each other in a certain direction. As such, it is helpful for the horizontal light (i.e., the light along the second direction D2) to pass through gaps between the first, second, and third filter units 210, 220, 230, so that the light can be prevented from being confined to a specific area. Therefore, the graininess of the image displayed by the display device can be effectively reduced.

Figure 8:
FIG. 8 is an image of a display device having a color filter array composed of a plurality of solid filter patterns.

FIG. 8 is an image of a display device having a color filter array composed of a plurality of solid filter patterns. The color filter array used in FIG. 8 is composed of general solid filter patterns (not shown), and the general solid patterns have the same size and colors as the first filter array 110, the second filter array 120, and the third filter array 130 of FIG. 1 of the present invention. However, as shown in FIG. 8, the image displayed by the display device having the color filter array composed of the solid filter patterns is obviously grainy.

Figure 9:
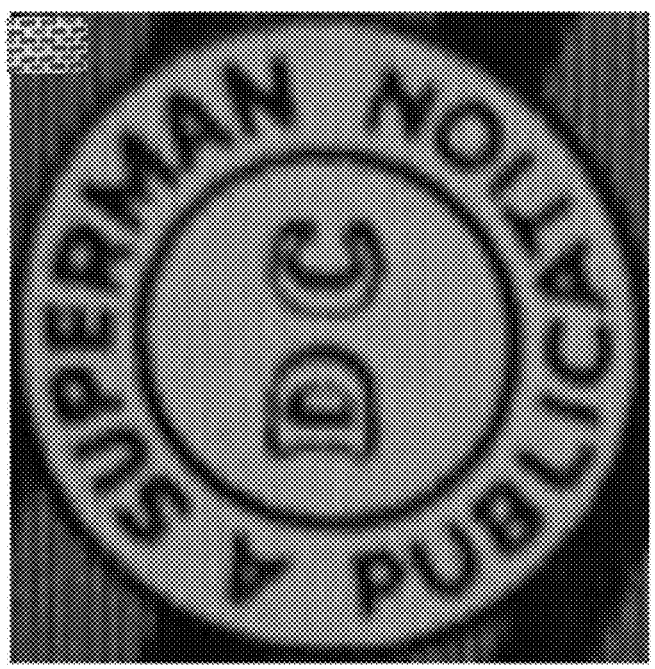
FIG. 9 is an image of a display device having the color filter array of FIG. 7.

FIG. 9 is an image of a display device having the color filter array of FIG. 7. As shown in FIG. 9, the graininess of the image displayed by the display device having the first filter units 210, the second filters unit 220, and the third filter units 230 shown in FIG. 7 is greatly reduced. From this, it can be seen that the use of the first, second, and third filter units 210, 220, and 230 arranged in a staggered arrangement of the present invention helps to improve the graininess of the image displayed by the display device.

Please continue to refer to FIG. 7, in some embodiments, the first filter units 210 is adjacent to and substantially aligned with the second filter unit 2202 and the third filter unit 2302 along the first direction D1.

In some embodiments, each of the first filter units 210, each of the second filter units 220, and each of the third filter units 230 are rectangular when viewed from above. In some embodiments, the aforementioned first direction D1 is a length direction of each of the first filter units 210, and the second direction D2 is a width direction of each of the first filter units 210. In some embodiments, the length L2 of each of the first filter units 110 is between 100 μm and 150 μm. In some embodiments, the width W2 of each of the first filter units 210 is between 30 μm and 55 μm. In some embodiments, a ratio of the width W2 to the length L2 is greater than or equal to ⅓. The dimensional relationship of the first filter unit 110 disclosed above and below can also be applied to the second filter unit 220 and the third filter unit 230 shown in FIG. 7. In some embodiments, after reliability test, the filter unit (e.g., the first filter unit 210, the second filter unit 220 or the third filter unit 230) having the ratio W2/L2 greater than or equal to ⅓ does not break or generate bubbles.

In some embodiments, an edge of the first filter unit 210 and an edge of the third filter unit 2304 are aligned with each other along the second direction D2 (i.e., the width direction).

In some embodiments, a projection of the first filter unit 210 along the second direction D2 (i.e., the width direction) partially overlaps with the second filter unit 2204, and there is an overlap length OL therebetween, and the overlap length OL is smaller than the length L2 of each of the first filter units 110. In some embodiments, the overlap length OL is between 5 μm and 80 μm, such as 10 μm, 15 μm, 20 μm, 25 μm, 30 μm, 35 μm, 40 μm, 45 μm, 50 μm, 55 μm, 60 μm, 65 μm, 70 μm or 75 μm. In some embodiments, a ratio of the length L2 to the overlap length OL is between 1.3:1 and 30:1.

In some embodiments, the overlap length OL is less than or equal to a spacing S2 between the first filter unit 210 and the adjacent second filter unit 2202. In some embodiments, the overlap length OL is between 5 μm and 50 μm, and the spacing S2 is between 30 μm and 50 μm.

In some embodiments, the spacing S2 is greater than or equal to a spacing S3 between the first filter unit 210 and the adjacent second filter unit 2204. In some embodiments, the spacing S3 is between 25 μm and 45 μm.

Figure 10:
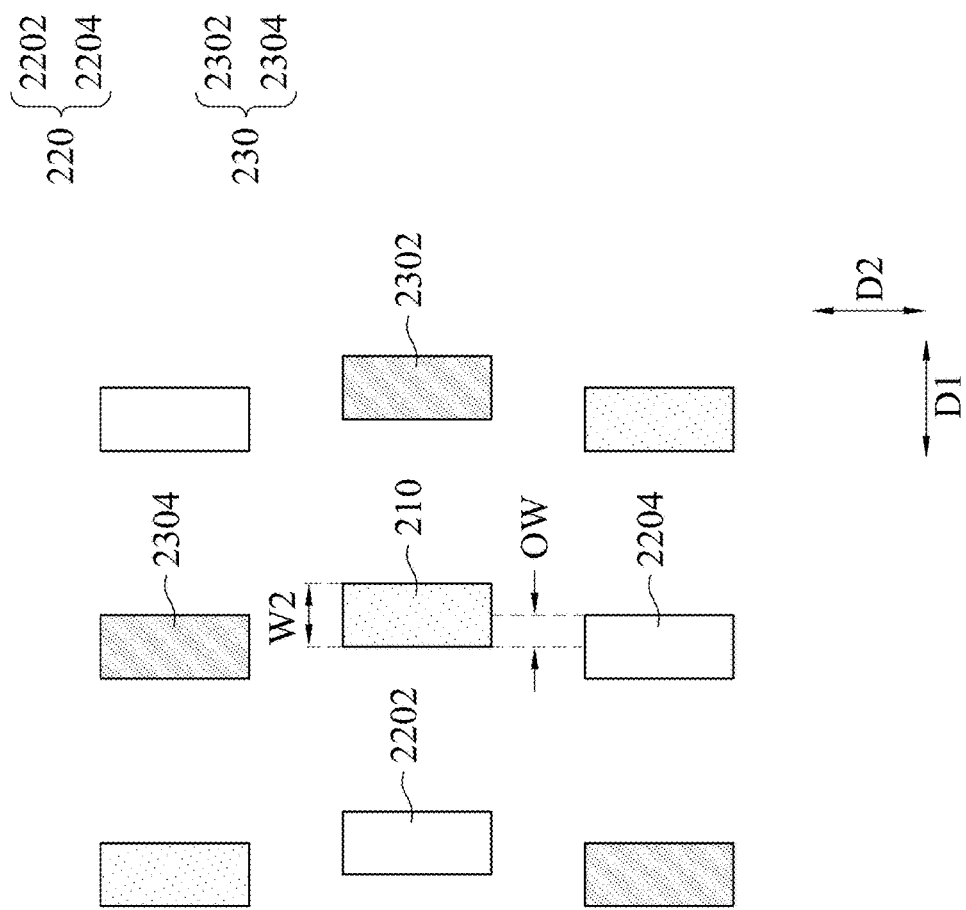
FIG. 10 is a schematic top view of a color filter array according to an embodiment of the present invention.

FIG. 10 is a schematic top view of a color filter array according to an embodiment of the present invention. The difference between the embodiment in FIG. 10 and the embodiment in FIG. 7 is that the first direction D1 is the width direction of each of the first filter units 210, and the second direction D2 is the length direction of each of the first filter units 210. Each of the first filter units 210 is arranged in a staggered arrangement with one second filter unit 2204 of the second filter units 220 and one third filter unit 2304 of the third filter units 230 along the second direction D2 (i.e., the length direction). As such, it is helpful for the longitudinal light (i.e., the light along the second direction D2) to pass through gaps between the first, second, and third filter units 210, 220, 230, so that the light can be prevented from being confined to a specific area. Therefore, the graininess of the image displayed by the display device can be effectively reduced.

In some embodiments, as shown in FIG. 10, a projection of the first filter unit 210 along the second direction D2 (i.e., the length direction) partially overlaps with the second filter unit 2204, and there is an overlap width OW therebetween. In some embodiments, the overlap width OW is between 5 µm and 45 µm. In some embodiments, a ratio of the width W2 of the first filter unit 210 to the overlap width OW is between 1.3:1 and 30:1.

The features of various embodiments are briefly mentioned above, so those skilled in the art can better understand various aspects of the present invention. Those skilled in the art should realize that in order to implement the same purpose and/or achieve the same advantages of the embodiments presented herein, and they can easily use the present invention as a basis for designing or modifying other processes and structures. Those skilled in the art should also understand that these equal constructions do not depart from the spirit and scope of the present invention, and that they can make various changes and substitutions here without departing from the spirit and scope of the present invention.

What is claimed is:

1. A color filter array for a reflective display device, comprising:
   a plurality of first filter units;
   a plurality of second filter units; and
   a plurality of third filter units, wherein the first filter units, the second filter units, and the third filter units have different colors,
   each of the first filter units being adjacent to one of the second filter units and one of the third filter units along a first direction and a second direction, and
   one of the first filter units being in a staggered arrangement with another of the second filter units and another of the third filter units along the second direction, and the first direction and the second direction being perpendicular to each other, wherein a projection of one the first filter units is completely overlapped with a projection of the adjacent one of the second filter units along the first direction, wherein a projection of the first filter unit in a second direction partially overlaps with the other of the second filter units.

2. The color filter array of claim 1, wherein each of the first filter units, each of the second filter units, and each of the third filter units are rectangular when viewed from above.

3. The color filter array of claim 2, wherein the first direction is a length direction of each of the first filter units, and the second direction is a width direction of each of the first filter units.

4. The color filter array of claim 1, wherein an edge of the first filter unit is aligned with an edge of the other of the third filter units along the second direction.

5. The color filter array of claim 1, wherein a ratio of a width of each of the first filter units to a length of each of the first filter units is greater than or equal to ⅓.

* * * * *